(12) United States Patent
Yamamoto

(10) Patent No.: US 7,915,335 B2
(45) Date of Patent: Mar. 29, 2011

(54) RUBBER COMPOSITION AND PNEUMATIC TIRE

(75) Inventor: Shinya Yamamoto, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 82 days.

(21) Appl. No.: 12/202,458

(22) Filed: Sep. 2, 2008

(65) Prior Publication Data

US 2009/0062433 A1 Mar. 5, 2009

(30) Foreign Application Priority Data

Sep. 5, 2007 (JP) .................. 2007-230293

(51) Int. Cl.
*C08K 3/04* (2006.01)
*C08L 9/00* (2006.01)
*B60C 1/00* (2006.01)

(52) U.S. Cl. ........ 524/496; 524/495; 524/847; 524/492; 524/9; 524/571; 524/261

(58) Field of Classification Search .................. 524/495, 524/847, 15, 9, 496
See application file for complete search history.

(56) References Cited

U.S. PATENT DOCUMENTS

| 6,537,947 B1 * | 3/2003 | Johns et al. ............... 502/416 |
| 2006/0183840 A1 * | 8/2006 | Hirayama et al. ........... 524/493 |

FOREIGN PATENT DOCUMENTS

| JP | 11-269306 | * | 10/1999 |
| JP | 2000-211315 | | 8/2000 |
| JP | 2005-146076 | | 6/2005 |
| JP | 2005-162865 | * | 6/2005 |
| JP | 2006-298215 | * | 11/2006 |
| JP | 2007-126524 | * | 5/2007 |
| WO | WO 88/06171 A1 | * | 8/1988 |

OTHER PUBLICATIONS

JP 2006-298215 (Toda; Nov. 2006) machine translation in English.*
Castro, J.B., Bonelli, P.R., Cerrella, E.G., Cukierman, A. L. Ind. Eng. Chem. Res. 2000, 39, 4166-4172.*
Batra, V.S., Urbonaite, S., Svensson, G., Fuel, 2008, 87, 2972-2976.*
Cetin, E., Moghtaderi, B., Gupta, R., Wall, T.F., Fuel, 2004, 83, 2139-2150.*
Darmstadt, H., Garcia-Perez, M., Chaala, A., Cao, N.-Z., Roy, C., Carbon, 2001, 39, 815-825.*
Zandersons, J., Gravitis, J., Kokorevics, A., Zhurnish, A., Bikovens, O., Tardenaka, A., Spince, B., Biomass and Bioenergy, 1999, 17, 209-219.*
Erlich, C., Ohman, M., Bjornbom, E., Fransson, T. H., 2005, 84, 569-575.*
Rasul, M.G., Rudolph, V., Fuel, 2000, 79, 123-130.*
Paya, J., Monzo, J., Borrachero, M.V., Diaz-Pinzon, J., Ordonez, L.M., J. Chem. Technol. Biotechnol., 2002, 77, 321-325.*

* cited by examiner

*Primary Examiner* — Rip A. Lee
(74) *Attorney, Agent, or Firm* — Fish & Richardson P.C.

(57) ABSTRACT

A rubber composition is provided that attains both low heat generating property and high reinforcement property simultaneously at high levels, is capable of attaining low fuel consumption through the tire, is excellent in durability, and is good in workability and surface property. The rubber composition contains 100 parts by weight of a diene rubber component, from 0.5 to 50 parts by weight of bagasse charcoal having a BET specific surface area of from 10 to 300 m$^2$/g, and at least one of carbon black and silica. The total amount of the bagasse charcoal, the carbon black and the silica is preferably from 30 to 100 parts by weight per 100 parts by weight of the diene rubber component.

8 Claims, No Drawings

RUBBER COMPOSITION AND PNEUMATIC TIRE

BACKGROUND OF THE INVENTION

1. Field of the Invention

The present invention relates to a rubber composition and a pneumatic tire containing the rubber composition used in at least a part of the tire.

2. Related Art

According to an increasing demand of reducing fuel consumption of automobiles in recent years, there is a strong demand of decreasing the rolling resistance of tires. It has been known that the rolling resistance relates to heat generation of a rubber composition, and decrease of a hysteresis loss of rubber, i.e., suppression of a loss coefficient (tan $\delta$) of a rubber composition to a low level, is effective for decreasing the rolling resistance.

Various proposals have been made as a technique for suppressing heat generation of a rubber composition, and for example, JP-A-2005-146076 discloses a rubber composition for a side tread that contains 100 parts by weight of vulcanizable rubber containing 65% by weight or more of natural rubber or polybutadiene rubber, from 30 to 80 parts by weight in total of silica and/or carbon black having a nitrogen absorption specific surface area ($N_2SA$) of from 20 to 85 $m^2/g$, and from 0.1 to 10 parts by weight of a specific cyclic polysulfide, thereby having high hardness and high strength and elongation, and being suppressed in increase of tan $\delta$.

In recent years, an ethanol fuel is receiving attention as a fuel for automobiles, and the demanded amount thereof is being increased quickly. Various studies have been made for reuse of bagasse, which is a squeezed residue of sugarcane as a raw material of an ethanol fuel. For example, there are studies of using bagasse as a soil ameliorant, an energy source for factories, livestock feed, and raw material of paper.

Charcoal is produced with bagasse in recent years. Bagasse charcoal is suitable for growth of microorganisms, such as phosphate-solubilizing bacteria, owing to the porous structure thereof, and has high water retention capability. Accordingly, bagasse charcoal is intended to be used as a soil ameliorant of farmland for enhancing yields and qualities of crops.

The use of porous particles mixed in a rubber composition for a tire has been disclosed in literatures. For example, JP-A-2000-211315 discloses a rubber composition for a tread in which from 2 to 30 parts by weight, based on 100 parts by weight of a rubber base material, of porous particles (activated charcoal) having an average particle diameter of 20 $\mu m$ or less and a specific surface area of 800 $m^2/g$ or more are mixed, JP-A-11-269306 discloses a rubber composition for a winter tire in which from 1 to 10 parts by weight of activated carbon particles having an average particle diameter of from 30 to 500 $\mu m$ and the same weight parts as the activated carbon or less of powdered vulcanized rubber having an average particle diameter of from 50 to 1,000 $\mu m$ are mixed based on 100 parts by weight of rubber, and JP-A-2005-162865 discloses a rubber composition in which from 1 to 20 parts by weight, based on 100 parts by weight of a diene rubber component, of particles containing a vegetable porous carbide (bamboo charcoal) are mixed. All the rubber compositions are disclosed that they improve performance of tires on ice and snow, particularly frictional force on ice. However, it has not yet known that the bagasse charcoal having porous nature is mixed in a rubber composition.

A rubber composition for a tire is demanded to cause less heat generation and to have high reinforcement property for reducing rolling resistance and ensuring durability of the tire. According to the demands, such a method has been conventionally studied that SBR and BR are mixed with a formulation containing mainly natural rubber for reducing tan $\delta$ of the rubber composition as less as possible, whereby heat generation of the rubber composition itself is suppressed. Upon increasing the ratio of natural rubber, however, the breaking strength is improved, but there is a tendency that the low heat generating property cannot be obtained, and thus it is difficult to attain both low heat generating property and high reinforcement property simultaneously at high levels.

The rubber composition is also demanded to be excellent in workability including rolling workability and extrusion workability and be good in surface property of a molded article. Upon increasing the addition amount of the reinforcing filler, however, there is a tendency that the workability and the surface property are deteriorated.

BRIEF SUMMARY OF THE INVENTION

Under the circumstances, an object of the invention is to provide a rubber composition suitable for a tire that contains natural rubber or a mixed system of natural rubber and diene synthetic rubber, attains both low heat generating property and high reinforcement property simultaneously at high levels, is capable of attaining low fuel consumption through the tire, is excellent in durability, and is good in workability and surface property.

As a result of earnest investigations on various kinds of porous particles as a reinforcing filler for solving the problems made by the inventors, it has been found that bagasse charcoal having a particular specific surface area can decrease heat generating property of a rubber composition while maintaining workability and reinforcement property in a well balanced manner.

The invention relates to, as one aspect, a rubber composition containing 100 parts by weight of a diene rubber component, from 0.5 to 50 parts by weight of bagasse charcoal having a BET specific surface area of from 10 to 300 $m^2/g$, and at least one of carbon black and silica.

It is preferred in the rubber composition of the invention that a total amount of the bagasse charcoal, the carbon black and the silica is from 30 to 100 parts by weight per 100 parts by weight of the diene rubber component.

The invention also relates to, as another aspect, a pneumatic tire containing the rubber composition as at least a part of the pneumatic tire.

DETAILED DESCRIPTION OF THE INVENTION

In the rubber composition of the invention, diene rubber is used as a rubber component. Examples of the diene rubber include natural rubber, and also include diene synthetic rubber, such as isoprene rubber, butadiene rubber, styrene-butadiene rubber, butyl rubber, halogenated butyl rubber, chloroprene rubber and acrylonitrile rubber, which may be used solely or as a mixture of two or more of them at an arbitrary ratio. The synthetic diene rubber may be produced by any of emulsion polymerization and solution polymerization, and is not particularly limited in microstructure.

Bagasse charcoal used in the invention is in the form of porous particles (powder) and is produced by carbonizing bagasse, which is a squeezed residue of sugarcane. The production method of the bagasse charcoal is not particularly limited, and for example, bagasse is carbonized in a pyrolysis furnace shielded from the outside air, at a temperature of from 400 to 800° C. for a prescribed period of time to form a carbide, which is then pulverized with a pulverizing machine to provide bagasse charcoal.

In the rubber composition of the invention, bagasse charcoal having a BET specific surface area of from 10 to 300 m²/g is used. In the case where the BET specific surface area of the bagasse charcoal is less than 10 m²/g, the bonding force to the rubber component is decreased to provide a tendency of decreasing the reinforcement property, and in the case where the BET specific surface area exceeds 300 m²/g, the heat generating property may not be lowered, and the workability and the surface property may not be improved. The BET specific surface area of the bagasse charcoal is more preferably from 20 to 280 m²/g, and particularly preferably from 25 to 250 m²/g. The BET specific surface area herein is a value measured according to JIS K6217.

The BET specific surface area of the bagasse charcoal can be controlled, for example, by appropriately setting the carbonizing temperature upon production thereof within a range of from 400 to 800° C. More specifically, the carbonizing temperature is set at an interval of 50° C. within a range of from 400 to 800° C., and bagasse is carbonized at the maximum carbonizing temperature under each temperature condition for a retention time of 3 hours, thereby providing bagasse charcoal with various BET specific surface areas corresponding to the carbonizing temperatures.

The bagasse charcoal is mixed in an amount of from 0.5 to 50 parts by weight per 100 parts by weight of the diene rubber component. In the case where the amount of the bagasse charcoal mixed is less than 0.5 part by weight, the advantages of the invention may not be exhibited, and in the case where the amount of the bagasse charcoal exceeds 50 parts by weight, the heat generation is lowered, but the reinforcement property of the rubber composition is also lowered to deteriorate the balance between them.

The average particle diameter of the bagasse charcoal is not particularly limited and is preferably from 0.1 to 500 μm. The average particle diameter herein is a value measured with LA700, produced by Horiba, Ltd.

The rubber composition of the invention contains, in addition to the bagasse charcoal, at least one of carbon black and silica as a reinforcing filler. The reinforcement property of the rubber composition may be insufficient only with the bagasse charcoal, and thus at least one of carbon black and silica is used in combination to lower the heat generating property while maintaining the reinforcement property of the rubber composition.

The carbon black used is not particularly limited, and examples thereof include various kinds of carbon black including such grades as SAF, ISAF, HAF, FEF and GPF, which may be used solely or in combination of two or more of them depending on the region in the tire and the purpose thereof.

Examples of the silica include ones having colloidal nature with a BET specific surface area of 250 m²/g or less and a DBP oil adsorption amount of 200 mL or less per 100 g. Silica having these properties can maintain the workability and decrease the heat generating property of the tire.

Examples of the silica include wet silica (hydrous silicate), dry silica (anhydrous silicate), calcium silicate and aluminum silicate, and among these, wet silica is preferred since it attains both fracture characteristics and low rolling resistance and is excellent in productivity. Examples of a commercially available product therefor include Nipsil AQ, available from Tosoh Silica Corporation, and Tokusil, available from Tokuyama Corporation.

The silica may be surface-treated silica having been improved in affinity with a polymer by treating the surface thereof with an amine compound, an organic polymer or the like.

In the case where silica is used, a silane coupling agent is preferably used in an amount of from 2 to 25% by weight, and more preferably from 5 to 15% by weight, based on the amount of the silica.

Examples of the silane coupling agent include a silane coupling agent that has a sulfide bond represented by the following formula (1).

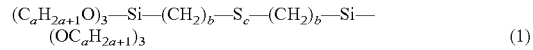

$$(C_aH_{2a+1}O)_3\text{—Si—}(CH_2)_b\text{—}S_c\text{—}(CH_2)_b\text{—Si—}(OC_aH_{2a+1})_3 \quad (1)$$

wherein a represents an integer of from 1 to 3, b represents an integer of from 1 to 4, and c represents the number of sulfur atoms, which is from 2 to 4 in average.

Preferred examples of the silane coupling agent represented by the formula (1) include bis(3-triethoxysilylpropyl)polysulfide, bis(2-triethoxysilylethyl)polysulfide, bis(4-triethoxysilylbutyl)polysulfide, bis(3-trimethoxysilylpropyl)polysulfide and bis(2-trimethoxysilylethyl)polysulfide. Among these, bis(3-triethoxysilylpropyl)tetrasulfide, bis(3-triethoxysilylpropyl)disulfide and the like are preferred, and examples of a commercially available product therefor include Si-69 and Si-75, available from Degussa AG.

A silane coupling agent represented by the following formula (2) may also be used.

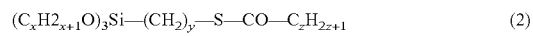

$$(C_xH_{2x+1}O)_3\text{Si—}(CH_2)_y\text{—S—CO—}C_zH_{2z+1} \quad (2)$$

wherein x represents an integer of from 1 to 3, y represents an integer of from 1 to 5, and z represents an integer of from 5 to 9.

A silane coupling agent represented by the formula (2) is blocked mercaptosilane, and examples of a commercially available product therefor are available from Momentive Performance Materials, wherein x=2, y=3, and z=7 in the formula (2).

In the rubber composition of the invention, the total amount of the bagasse charcoal, the carbon black and the silica is preferably from 30 to 100 parts by weight per 100 parts by weight of the diene rubber component. In the case where the total amount of the reinforcing fillers is less than 30 parts by weight, the reinforcement property may not be maintained, and in the case where the amount exceeds 100 parts by weight, there is a tendency of deteriorating the workability and the surface property. The total amount of the reinforcing fillers is more preferably from 40 to 80 parts by weight.

The rubber composition of the invention may further contain, in addition to the aforementioned components, various additives that have been ordinarily used in the rubber industries, such as a softening agent, a plasticizer, zinc flower, stearic acid, an antiaging agent, wax, a vulcanizing agent, a vulcanization assistant and a resin, in an amount that does not impair the advantages of the invention. The rubber composition may be prepared according to an ordinary method with a rubber kneading machine, such as a Banbury mixer and a kneader.

A rubber composition obtained according to the invention attains both low heat generating property and high reinforcement property simultaneously at high levels, and thus is favorably used as a rubber composition for a tire. Specifically, the rubber composition can be favorably used as various rubber materials, such as those for tread rubber (including cap tread rubber and base tread rubber), side wall rubber, belt coating rubber, ply coating rubber, inner liner rubber and rim strip, of pneumatic tires of various applications and sizes including those for passenger vehicles and large-sized tires for cargo trucks and buses.

EXAMPLE

The invention will be described with reference to examples below, but the invention is not construed as being limited to the examples.

According to the formulations shown in Table 1, rubber compositions were prepared by kneading the components with a 20-L closed Banbury mixer. The components shown in Table 1 were as follows.

Components

Natural rubber: RSS #3 (Tg=−60° C.)
Butadiene rubber: BR150B, available from Ube Industries, Ltd. (high cis-1,4-bond content type, 1,4-butadiene unit amount: 97% by weight, Tg=−104° C.)
Carbon black N339: Seast KH, available from Tokai Carbon Co., Ltd. (BET specific surface area: 91 $m^2/g$)
Silica: Nipsil AQ, available from Tosoh Silica Corporation
Bagasse charcoal (1): BET specific surface area: 250 $m^2/g$, average particle diameter: 12 μm
Bagasse charcoal (2): BET specific surface area: 30 $m^2/g$, average particle diameter: 20 μm
Bincho charcoal: BET specific surface area: 125 $m^2/g$
Carbon black N660: Seast V, available from Tokai Carbon Co., Ltd. (BET specific surface area: 35 $m^2/g$)
Coupling agent: silane coupling agent represented by the formula (1), Si69, available from Degussa AG The bagasse charcoal (1) was obtained in such a manner that bagasse was carbonized by heating in a pyrolysis furnace at about 600° C. to form a carbide, which was pulverized with a pulverizing machine. The bagasse charcoal (2) was obtained in the same manner as the bagasse charcoal (1) except that the carbonizing temperature was changed to about 400° C. The BET specific surface area was a specific surface area measured by the BET method with TriStar 3000, available from Shimadzu Corporation.

All the rubber components each contained, as common components, 20 parts by weight of an oil (JOMO Process P200, available from Japan Energy Corporation), 2 parts by weight of stearic acid (Lunac S-20, available from Kao Corporation), 3 parts by weight of zinc flower (Zinc Flower, First Class, available from Mitsui Mining And Smelting Co., Ltd.), 2 parts by weight of an antiaging agent (Antigen 6C, available from Sumitomo Chemical Co., Ltd.), 2 parts by weight of wax (Sunnoc N, available from Ouchi Shinko Chemical Industrial, Co., Ltd.), 1.5 parts by weight of a vulcanization accelerator (Soxinol CZ, available from Sumitomo Chemical Co., Ltd.) and 2.1 parts by weight of sulfur (Powdered Sulfur, available from Tsurumi Chemical Industry Co., Ltd.), per 100 parts by weight of the diene rubber component.

The resulting rubber compositions were evaluated for tan δ as an index of heat generating property, tension at break as an index of reinforcement property, and rubber surface property as an index of workability, according to the following manners. The results obtained are shown in Table 1.

tan δ tan δ was measured with a viscoelasticity tester, available from Toyo Seiki Seisaku-sho Ltd., under conditions of a frequency of 10 Hz, a static distortion of 10%, dynamic distortion of 1% and a temperature of 60° C., and expressed in terms of a value with respect to 100 for Comparative Example 1. A smaller value is favorable owing to less heat generation.

Tension at Break

The tension at break was measured with an automatic tensile tester, available from Ueshima Seisakusho Co., Ltd., and expressed in terms of a value with respect to 100 for Comparative Example 1. A larger value is favorable.

Rubber Surface Property

A test piece was prepared by subjecting the rubber composition to rolling process, and the surface state thereof was observed and evaluated sensorily by five grades with respect to "3" for Comparative Example 1. A larger number means a better rubber surface, i.e., better workability.

TABLE 1

| | | Comparative Example | | | | Example | | | | |
|---|---|---|---|---|---|---|---|---|---|---|
| | | 1 | 2 | 3 | 4 | 1 | 2 | 3 | 4 | 5 |
| Component (part by weight) | Natural rubber | 60 | 60 | 60 | 60 | 60 | 60 | 60 | 60 | 60 |
| | Butadiene rubber | 40 | 40 | 40 | 40 | 40 | 40 | 40 | 40 | 40 |
| | Carbon black N339 | 50 | 25 | 40 | 40 | 40 | 49 | 10 | 40 | 15 |
| | Silica | — | 25 | — | — | — | — | — | — | 25 |
| | Bagasse charcoal (1) | — | — | — | — | 10 | 1 | 40 | — | 10 |
| | Bagasse charcoal (2) | — | — | — | — | — | — | — | 10 | — |
| | Bincho charcoal | — | — | 10 | — | — | — | — | — | — |
| | Carbon black N660 | — | — | — | 10 | — | — | — | — | — |
| | Coupling agent | — | 2.5 | — | — | — | — | — | — | 2.5 |
| tan δ at 60° C. | | 100 | 96 | 99 | 94 | 92 | 98 | 87 | 89 | 90 |
| Tension at break | | 100 | 97 | 92 | 90 | 98 | 99 | 89 | 94 | 97 |
| Rubber surface property | | 3 | 2 | 2 | 4 | 3 | 3 | 4 | 5 | 3 |

It was understood from the results shown in Table 1 that in Examples according to the invention, both low heat generating property and high reinforcement property were attained simultaneously at high levels, and good rubber surface property (workability) was obtained. In Comparative Example 3 where bincho charcoal was used instead of the bagasse charcoal, on the other hand, the heat generating property was not lowered, and the reinforcement property was also deteriorated. In Comparative Example 4 where carbon black having a BET specific surface area equivalent to the bagasse charcoal (2) was used instead of the bagasse charcoal (2), the reinforcement property was largely deteriorated, and the heat generating property was less lowered, as compared to Example 4, and thus it failed to attain both low heat generating property and high reinforcement property simultaneously.

According to the invention a rubber composition suitable for a tire is provided that attains both low heat generating property and high reinforcement property simultaneously at high levels, is capable of attaining low fuel consumption through the tire, is excellent in durability, and is good in workability and surface property.

The rubber composition of the invention is favorably used particularly for a tire, and can be favorably used as various rubber materials of pneumatic tires, such as those for a tread part, a side wall part, a bead part, an inner liner and rubber for coating tire cords.

What is claimed is:

1. A rubber composition comprising 100 parts by weight of a diene rubber component, from 0.5 to 50 parts by weight of bagasse charcoal having a BET specific surface area of from 10 to 300 $m^2/g$, and at least one of carbon black and silica, the bagasse charcoal being in the form of porous particles produced by carbonizing bagasse under heating in a pyrolysis furnace shielded from outside air.

2. The rubber composition as claimed in claim 1, wherein a total amount of the bagasse charcoal, and the at least one of the carbon black and the silica is from 30 to 100 parts by weight per 100 parts by weight of the diene rubber component.

3. The rubber composition as claimed in claim 2, wherein the rubber composition contains both carbon black and silica, and contains a silane coupling agent in an amount of from 2 to 25% by weight based on the amount of the silica.

4. The rubber composition as claimed in claim 1, wherein the bagasse charcoal has a BET specific surface area of from 20 to 280 $m^2/g$.

5. The rubber composition as claimed in claim 1, wherein the bagasse charcoal has a BET specific surface area of from 25 to 250 $m^2/g$.

6. The rubber composition as claimed in claim 1, wherein the bagasse charcoal has an average particle diameter of from 0.1 to 500 µm.

7. A pneumatic tire comprising the rubber composition as claimed in claim 1 or 2 as at least a part of the pneumatic tire.

8. A pneumatic tire comprising the rubber composition as claimed in any one of claim 4 or 5 or 6 or 3 as at least a part of the pneumatic tire.

* * * * *